United States Patent
Chen et al.

(10) Patent No.: US 7,961,631 B2
(45) Date of Patent: Jun. 14, 2011

(54) SYSTEMS AND METHODS FOR CORRELATION OF BURST EVENTS AMONG DATA STREAMS

(75) Inventors: Shyh-Kwei Chen, Chappaqua, NY (US); Michail Vlachos, Tarrytown, NY (US); Kun-Lung Wu, Yorktown Heights, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 12/177,379

(22) Filed: Jul. 22, 2008

(65) Prior Publication Data
US 2009/0086755 A1 Apr. 2, 2009

Related U.S. Application Data

(63) Continuation of application No. 11/540,436, filed on Sep. 29, 2006.

(60) Provisional application No. 60/722,225, filed on Sep. 30, 2005.

(51) Int. Cl.
*G01R 31/08* (2006.01)
(52) U.S. Cl. ............ 370/241; 726/22; 386/201; 705/1.1
(58) Field of Classification Search .................. 370/468; 386/201; 705/1.1; 726/22
See application file for complete search history.

(56) References Cited

U.S. PATENT DOCUMENTS

| | | | |
|---|---|---|---|
| 6,993,246 B1 * | 1/2006 | Pan et al. ................ | 386/201 |
| 2003/0040955 A1 * | 2/2003 | Anaya et al. ............. | 705/10 |
| 2006/0101045 A1 | 5/2006 | Chen | |

OTHER PUBLICATIONS

D. S. Wise and Jeremy D. Frens and Yuhong Gu and Gregory A. Alexander, "Language Support for Morton-Order Matrices", Jun. 2001, Proceedings of the eigth ACM SIGPLAN symposium on Principles and Practices of Parallel Programming PPoPP, vol. 36, Issue 7, pp. 24-33.*

Vlachos, M., Meek, C., and Vagena, Z., Identifying Similarities, Periodicities and Bursts for Online Search Queries, SIGMOD 2004, Jun. 13-18, 2004, Paris France.

Heyer, L. J., Kruglyak, S., and Yooseph, S., Exploring Expression Data: Identification and Analysis of Coexpressed Genes, Genome Research, 1999, 9: 1106-1115, Cold Spring Harbor Laboratory Press, Woodbury NY.

Kleinberg, J., Bursty and Hierarchical Structure in Streams, 8th ACM SIGKDD International Conference on Knowledge Discovery and Data Mining, 2002.

Zhu, Y., and Shasha, D., Efficient Elastic Burst Detection in Data Streams, in Proceedings of ACM SIGKDD, 2003.

(Continued)

*Primary Examiner* — Kevin C Harper
*Assistant Examiner* — Sai-Ming Chan
(74) *Attorney, Agent, or Firm* — Ference & Associates LLC

(57) ABSTRACT

Systems and methods for the identification of correlated burst events among two or more data streams, given one or more specific query time spans are disclosed. Also broadly contemplated is the act of finding, from one or more data streams, those streams that have correlated burst events with another given data stream within a time span.

20 Claims, 10 Drawing Sheets

OTHER PUBLICATIONS

Stern, L., and Lightfoot, D., Automated Outbreak Detection: A Quantitative Retrospective Analysis, Epidemiology and Infection, 1999, 122, 103-110, Cambridge Press University.

Wong, W., Moore, A., Cooper, G., and Wagner, M., WSARE: What's Strange About Recent Events?, Journal of Urban Health: Bulletin of the New York Academy of Medicine, 2003, vol. 80, No. 2, The New York Academy of Medicine.

Leland, W., Taqqu, M., Willinger, W., and Wilson, D., On the Self-Similar Nature of Ethernet Traffic, ACM SIGCOMM, Computer Communication Review, 203-213.

Jiang, H., and Dovrolis, C., Why is the Internet Traffic Bursty in Short Time Scales?, SIGMETRICS'05, Jun. 6-10, 2005, Banff, Alberta, Canada.

\* cited by examiner

US 7,961,631 B2

SYSTEMS AND METHODS FOR CORRELATION OF BURST EVENTS AMONG DATA STREAMS

CROSS-REFERENCE TO RELATED APPLICATION

This application is a continuation application of copending U.S. patent application Ser. No. 11/540,436 filed on Sep. 29, 2006, now U.S. Pat. No. 7,940,672, which claims priority to U.S. Provisional Patent Application Ser. No. 60/722,225 filed on Sep. 30, 2005. These applications are hereby fully incorporated by reference as if set forth in their entirety herein.

This invention was made with government support under Contract No.: H98230-04-3-001 awarded by the U.S. Department of Defense. The Government has certain rights in this invention.

FIELD OF THE INVENTION

The present invention is generally related to methods and arrangements for the correlation of burst events among data streams.

BACKGROUND OF THE INVENTION

"Panta rhei", said Heraklitos; everything is 'in flux'. The truth of this famous aphorism by the ancient Greek philosopher can be said to be even more valid today. People are often confronted with the need to make decisions about financial, personal or inter-personal matters based on the observations of various factoring parameters. Therefore, since everything is in constant flow, monitoring the volatility/variability of important measurements over time becomes a critical determinant in any decision making process.

When dealing with time sequences, or time-series data, one important indicator of change is the presence of 'burstiness', which suggests that more events of importance are happening within the same time frame. Therefore, the identification of bursts can provide useful insights about an imminent change in the monitoring quantity, allowing a system analyst or individual to execute a timely and informed decision.

Monitoring and modeling of burst behavior is important in many areas. For example, in computer networks, it is generally recognized that network traffic can be bursty in various time-scales (e.g., "Why is the Internet traffic bursty in short (sub-RTT) time scales?" by H. Jiang et. al., in Proceedings of ACM SIGMETRICS, 2005; "On the self-similar nature of Ethernet traffic," by W. E. Leland et. al., in Proceedings of ACM SIGCOMM, 1993.) The detection of bursts is therefore inherently important for identifying network bottlenecks or for intrusion detection, since an excessive amount of incoming packets may be a valid indication that a network system is under attack. Additionally, for applications such as fraud detection, it is critical to efficiently recognize any anomalous activity (typically in the form of over-utilization of resources). For example, burst detection techniques can be fruitfully utilized for spotting suspicious activities in large stock trading volumes or for the identification of fraudulent phone activity. Finally, in epidemiology and bio-terrorism, scientists are interested in the early detection of a disease outbreak. This may be indicated by the discovery of a sudden increase in the number of illnesses or visits to the doctor within a certain geographic area (e.g., "WSARE: What's strange about recent events?" by W.-K. Wong, et. al., in Journal of Urban Health 80, 2005; "Automated outbreak detection: a quantitative retrospective analysis," by L. Stem, et. al., in Epidemiology and Infection 122, 1999).

Many recent works address the problem of burst detection (e.g., "Efficient elastic burst detection in data streams," by Y. Zhu, et. al., in Proceedings of ACM SIGKDD, 2003; "Bursty and hierarchical structure in streams," by J. Kleinberg in Proceedings of ACM SIGKDD, 2002). However, in many disciplines, more effective knowledge discovery can be achieved by identifying correlated bursts when monitoring multiple data sources. From a data-mining perspective, this task is more compelling and challenging, since it involves the identification of burst 'clusters' and it can also aid the discovery of causal chains of burst events, which possibly occur across multiple data streams.

Instances of burst correlation problems can be encountered in many financial and stock market applications, e.g., for triggering fraud alarms. For example, if there are correlated burst events among a phone call stream and other stock trading streams, alerts might be raised for further investigations for potential insider trading activities. Burst correlations can also be used to diagnose system performance problems in a complex computer system with many resources, such as multiple CPUs, disks, communication links and routers. In such a system, the utilization readings from individual resources represent the data streams. If one can find utilization readings from some resources which exhibit correlated burst events, then one can diagnose potential system problems and tune the system accordingly. Finally, burst correlation can be applicable for the discovery and measurement of gene co-expression (in that particular application, a burst is normally referred to with the term 'up-regulation'), which holds substantial biological significance, since it can provide insight into functionally related groups of genes and proteins (e.g., "Exploring expression data: identification and analysis of co-expressed genes," by L. J. Heyer, et. al., in Genome Research, 9:11, 1999).

In the publication "Identification of similarities, periodicities and bursts for online search queries," by M. Vlachos, et. al., in Proceedings of ACM SIGMOD, 2004, bursts detected from multiple time series stored in a static database were represented as time intervals of their occurrences. However, those time series cannot be regarded as data streams and, as such, a much different environment than that contemplated herein is presented, in that there is no need to do incremental computation as typically needed in data stream applications.

In view of the foregoing, a need has been recognized in connection with providing an efficient and effective method for the correlation of burst events among two or more data streams.

SUMMARY OF THE INVENTION

In accordance with at least one presently preferred embodiment, the present invention relates to the identification of correlated burst events among two or more data streams, given one or more specific query time spans. Also broadly contemplated is finding, from one or more data streams, those streams that have correlated burst events with another given data stream within a time span.

Broadly contemplated herein is a method of extracting burst features from data streams and identifying which burst features are correlated within the given one or more query time spans. From those correlated burst features, the streams that exhibit correlated burst features can be identified.

Broadly contemplated herein is a new burst detection scheme that uses a dynamic threshold, which is amenable to incremental computation and is tailored for skewed distributions in the data streams, such as the financial data. Additionally, there is introduced herein a memory-based index structure for the identification of overlapping bursts. The new index structure is based on the idea of containment-encoded intervals (CEI's), which were originally used for performing stabbing queries, not overlapping queries (see co-pending, U.S. patent application Ser. No. 10/982,570, "Method and Arrangement for Interval Query Indexing for Data Stream Processing). Building on the idea of encoded time intervals, there is broadly contemplated, in accordance with at least one presently preferred embodiment of the present invention, a new search algorithm that can efficiently answer overlapping range queries. Moreover, the index can be incrementally maintained with the addition of more recent data values.

In summary, one aspect of the invention provides a method of correlating burst events among two or more data streams, the method comprising the steps of: identifying burst features; maintaining and updating a burst feature index; searching the burst feature index; and identifying correlated data streams that exhibit burst events within one or more predetermined query time spans.

Another aspect of the invention provides a computer system for correlating burst events among two or more data streams, the system comprising: a module for identifying burst features; a module for maintaining and updating a burst feature index; a module for searching the burst feature index; and a module for identifying correlated data streams that exhibit burst events within one or more predetermined query time spans.

Furthermore, an additional aspect of the invention provides a program storage device readable by machine, tangibly embodying a program of instructions executable by the machine to perform method steps for correlating burst events among two or more data streams, the method comprising the steps of: identifying burst features; maintaining and updating a burst feature index; searching the burst feature index; and identifying correlated data streams that exhibit burst events within one or more predetermined query time spans.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
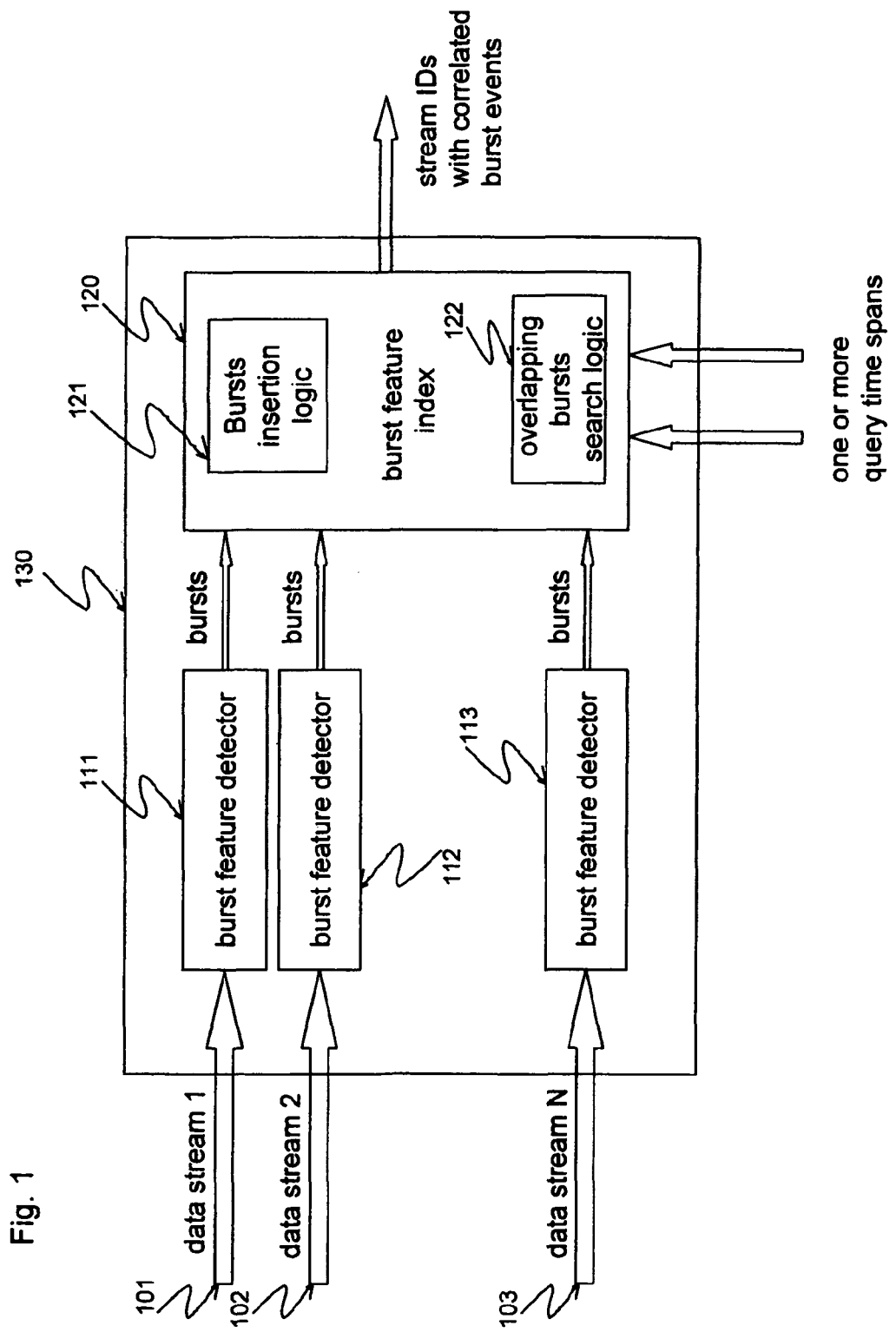
FIG. 1 schematically illustrates a system for correlating burst events among multiple data streams

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Speaking in general terms, there are broadly contemplated herein are methods for discovering correlated burst events among two or more data streams. That is, given one or more time regions of interest, one examines which data streams have exhibited burst events during those time frames. It can also be used to answer a query such as: "Given a data stream within a time window, find all other data streams that exhibit similar burst events as the given stream within that time window."

Preferably, a methodology for burst correlation between multiple streams of data includes at least two steps: a burst detection and a burst indexing.

Burst detection preferably involves finding deviants from a data distribution already seen, imposing a variable (over time) threshold on the examined data and taking advantage of the skewed distribution that is typically encountered in many applications. After bursts are spotted they are preferably transcribed into "burst intervals". Therefore, the burst correlation problem is solved by identifying overlapping burst intervals (or regions).

Preferably, the burst regions are organized in an indexing structure, in order to accommodate fast search performance. The indexing step utilizes a binary-tree inspired memory-based interval index for effectively identifying the overlapping burst regions.

Due to the effective burst detection scheme and an efficient in-memory index, one can achieve very low latency for the burst correlation scheme, achieving real-time responses for a large number of data streams.

Turning to specific embodiments of the present invention which address issues and problems as discussed hereinabove, it will be appreciated that contemplated herein is a complete framework for effective multi-stream burst correlation (i.e., burst correlation for two or more data streams).

Generally, multiple data streams are preferably monitored. In each data stream, a measured quantity will typically manifest continually in an unpredictable manner. The measured quality can be temperature, stock trading volume, stock price, network traffic volume, or any other conceivable measurement. A burst detection mechanism is preferably used to detect burst features from each data stream. A burst feature contains at least the time interval for the burst duration and the magnitude of the measured quantity during the burst interval. After being detected, each burst is preferably represented by at least a pair of numbers, indicating the start and end points of the burst interval. Additionally, a burst interval preferably contains a unique burst ID and the stream ID from which it is derived. The burst intervals are then indexed using a burst interval index. With the burst interval index, the problem of burst correlation is reduced into the problem of finding overlapping intervals. Those data streams exhibiting correlated burst events, during one or more given query spans, can be quickly identified by finding all the burst intervals that overlap with the query spans.

FIG. 1 shows a system block diagram that implements a general framework for correlating burst events among multiple data streams, for one or more given query spans. As shown, the entire system receives multiple data streams, such as streams 1, 2 ... N indicated at 101, 102 and 103. Each data stream is fed into a burst feature detector. For example, burst feature detector 111 is used to detect bursts existed in data stream 1 (101); burst feature detector 113 is used to detect bursts existed in data stream N (103). The burst feature detector 113 also transforms each detected burst into at least a burst interval, which is represented by a pair of numbers, indicating the start and end points of the burst duration. These burst intervals are then inserted into the burst feature index 120 by the burst insertion logic 121 (see FIG. 4 and associated description). For one or more given query time spans, the overlapping burst search logic 122 (see FIG. 6 and associated description) is used to find those bursts that exhibit correlated burst events in those time spans.

Figure 1A:
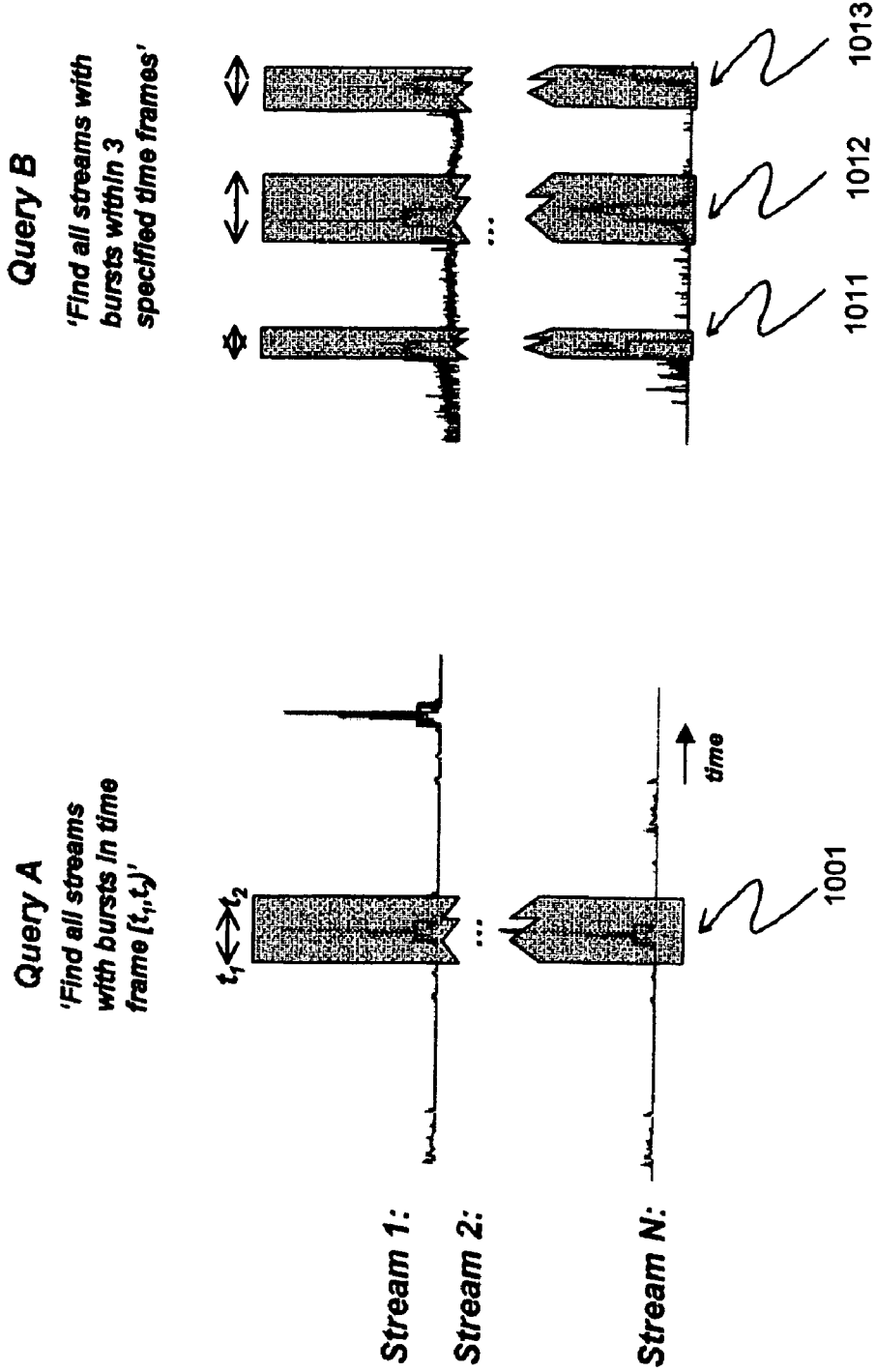
FIG. 1a illustrates two queries.

FIG. 1a shows a block diagram for two queries. Query A is to find all streams with bursts in a single time interval 1001. Any stream that has a burst overlapping with the query span is reported. Query B is to find all streams with bursts within 3 specified time spans 1011, 1012, and 1013. Note that a burst can overlap only partially with the specified query span.

Figure 1B:
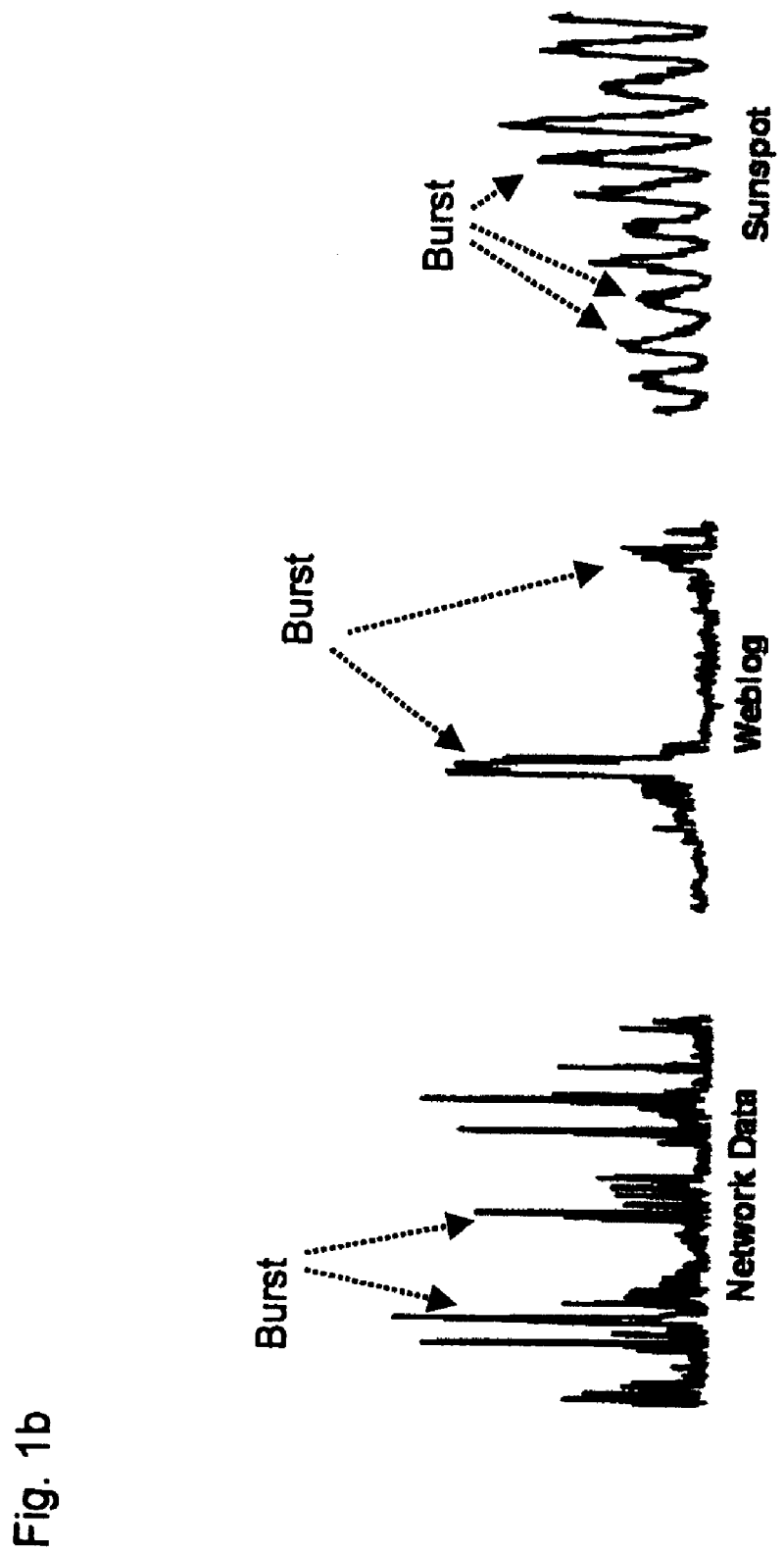
FIG. 1b depicts examples of bursts in various types of data streams.

A burst in a data stream can be regarded as a "deviant", or an over-expression of the measured quantity, compared with previously observed values. FIG. 1b shows examples of bursts in various types of data streams. For example, for a network data stream, a Web log data stream or a sunspot data stream, periods of high activities, or bursts, can all be observed.

Preferably, a burst detection process in accordance with a preferred embodiment of the present invention pinpoints the time instances that the data stream values deviate from the already observed data distribution. This can be accomplished by setting a threshold value. If at time t the value of the stream s(t) exceeds the specified threshold τ, then time t is marked as a burst.

The determination of the threshold τ depends on the distributional characteristics of the dataset. Assuming a Gaussian data distribution, threshold value τ could be set as the average value of the stream μ plus 3 times the standard deviation. Assuming a skewed data distribution (which is very common in streaming data), one can characterize the data distribution using an exponential model. As such, the cumulative distribution function (CDF) of the exponential distribution of a random variable X is given by:

$$P(X>\tau)=e^{-\lambda x}$$

where the mean value of X is 1/λ. Solving for x:

$$\tau=-\mu*lnP$$

The threshold τ for a skewed distribution can now be estimated by setting P to a very small value (e.g., $10^{-4}$) so that μ is the average value of the stream measured quantity within the examined window. It should be noted that the computed threshold τ is amenable to incremental computation since it involves only the computation of the average value (i.e., sum of the stream values divided by the stream window length) which can be maintained incrementally. Further, the threshold value τ does not need to be applied only on the exact values of the stream (s[i]). It can also be applied on any quantity derived from the stream values, e.g. a moving average of the stream values.

After the bursts within the stream window are marked, each identified burst is preferably transcribed into a burst record. Consecutive burst points are compacted into a burst interval, represented by its start and end position in time, such as [m,n), m<n. Burst points at time m are therefore represented by an interval [m,m+l).

Figure 2:
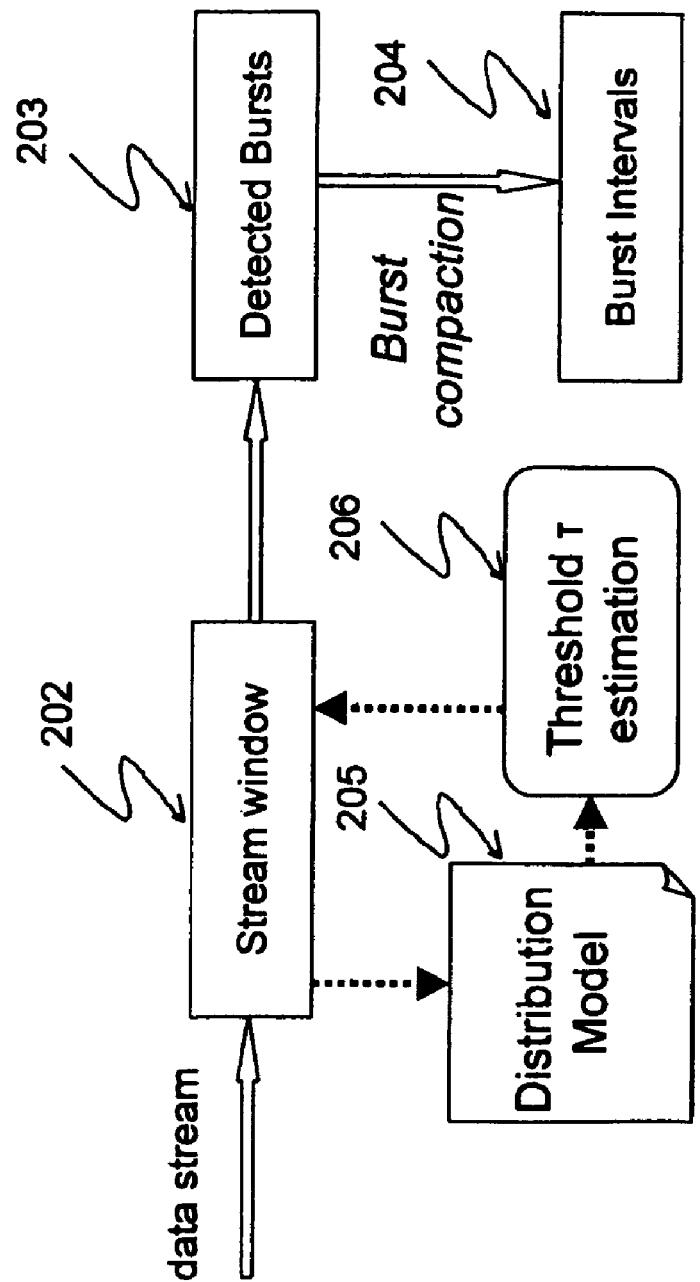
FIG. 2 schematically illustrates a general framework for burst detection.

A general framework for burst detection is shown in FIG. 2. Burst detection is applied within a time window 202 of the data stream, based on a threshold 206 and a distribution model 205. The result bursts 203 are then transformed into burst intervals 204.

Figure 2A:
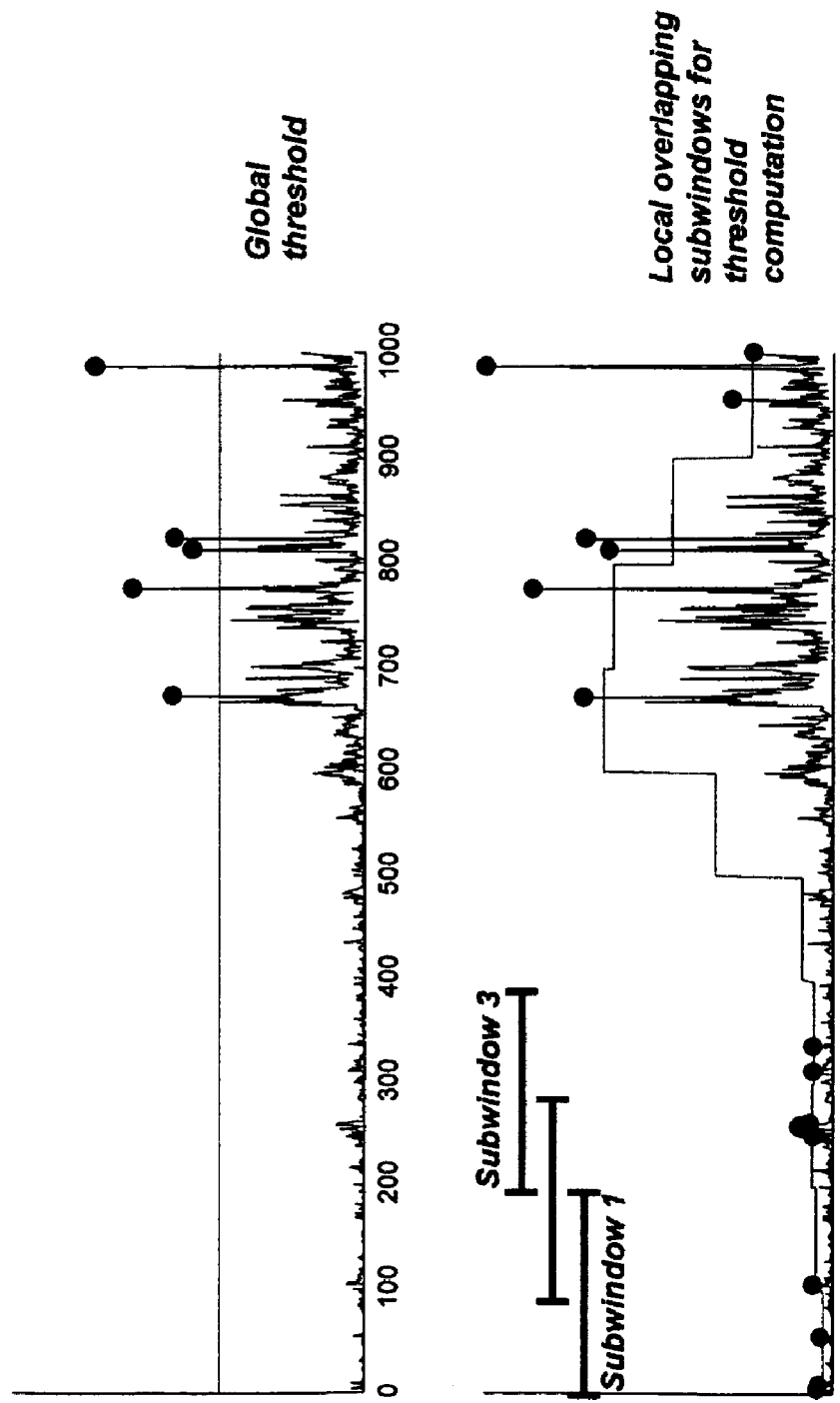
FIG. 2a conveys an example of a computed variable threshold.

It will be appreciated that the use of a global threshold τ within the stream window may introduce a bias when the stream values change drastically within the examined window, i.e. when there is a 'concept drift'. Therefore, one can compute a variable threshold, dividing the examined data into overlapping partitions. An example of the variable threshold is shown in FIG. 2a, where the length of the partition is 200 and the overlap is 100. At the overlapping part, the threshold is set as the average threshold calculated by the 2 consecutive windows.

Figure 2B:
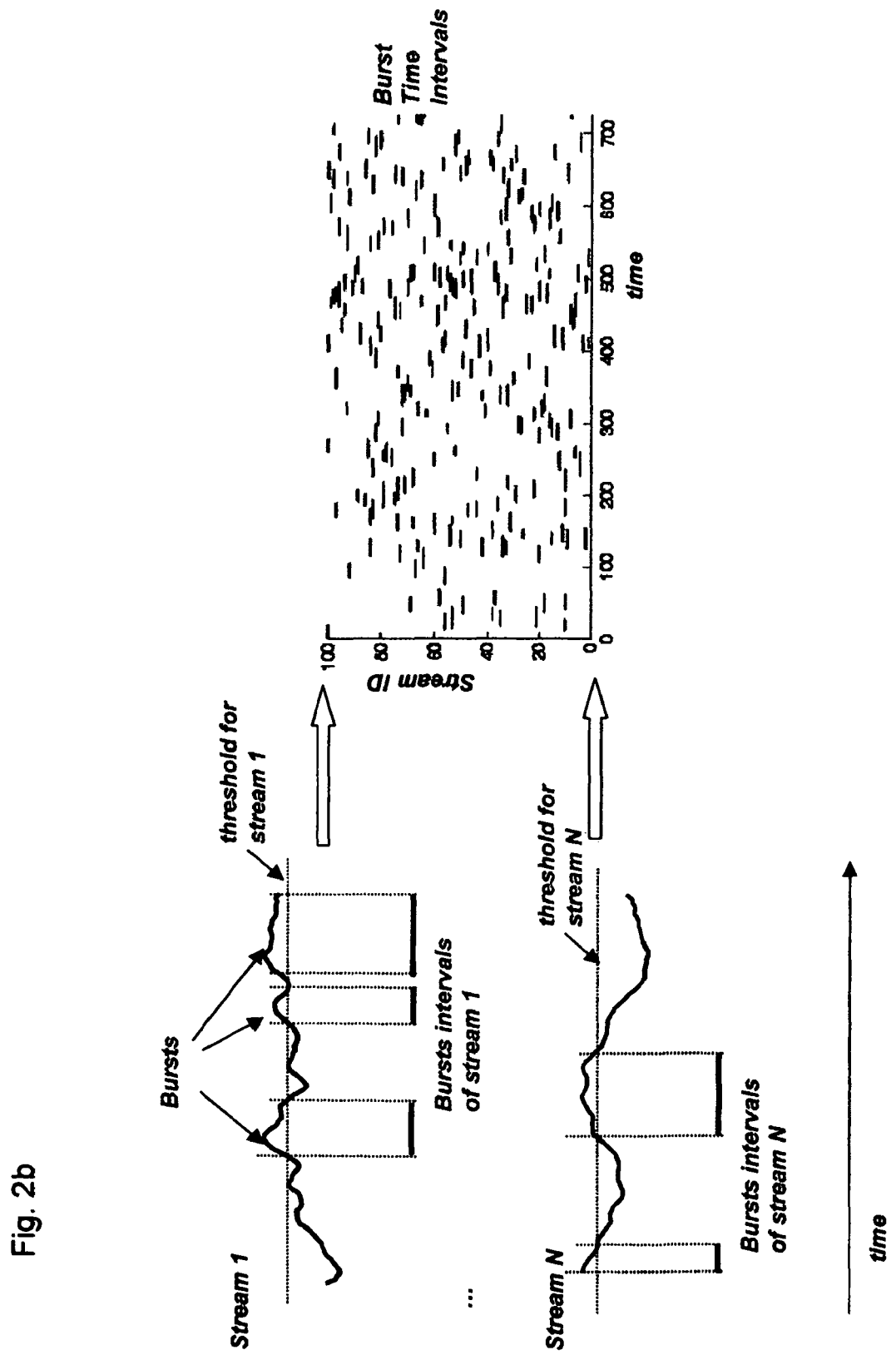
FIG. 2b depicts a result of transforming data streams into burst intervals.

FIG. 2b, depicts the result of transforming the streams into burst intervals, while the discussion now turns to an overview of how these burst intervals can be organized into an efficient index structure. Preferably, the detected burst intervals are inserted into a burst interval index. This burst interval is based on the idea of containment-encoded intervals, or CEIs. These CEIs can be viewed as multi-layered, overlapped grid intervals. They have well-defined length and positions. They exhibit containment relationship. Their IDs are encoded with such containment information. Thus, CEIs can also be referred to as encoded grid intervals. They are used to decompose burst intervals so that burst intervals are indexed with decomposed CEIs. Search is conducted indirectly via CEIs.

Figure 3:
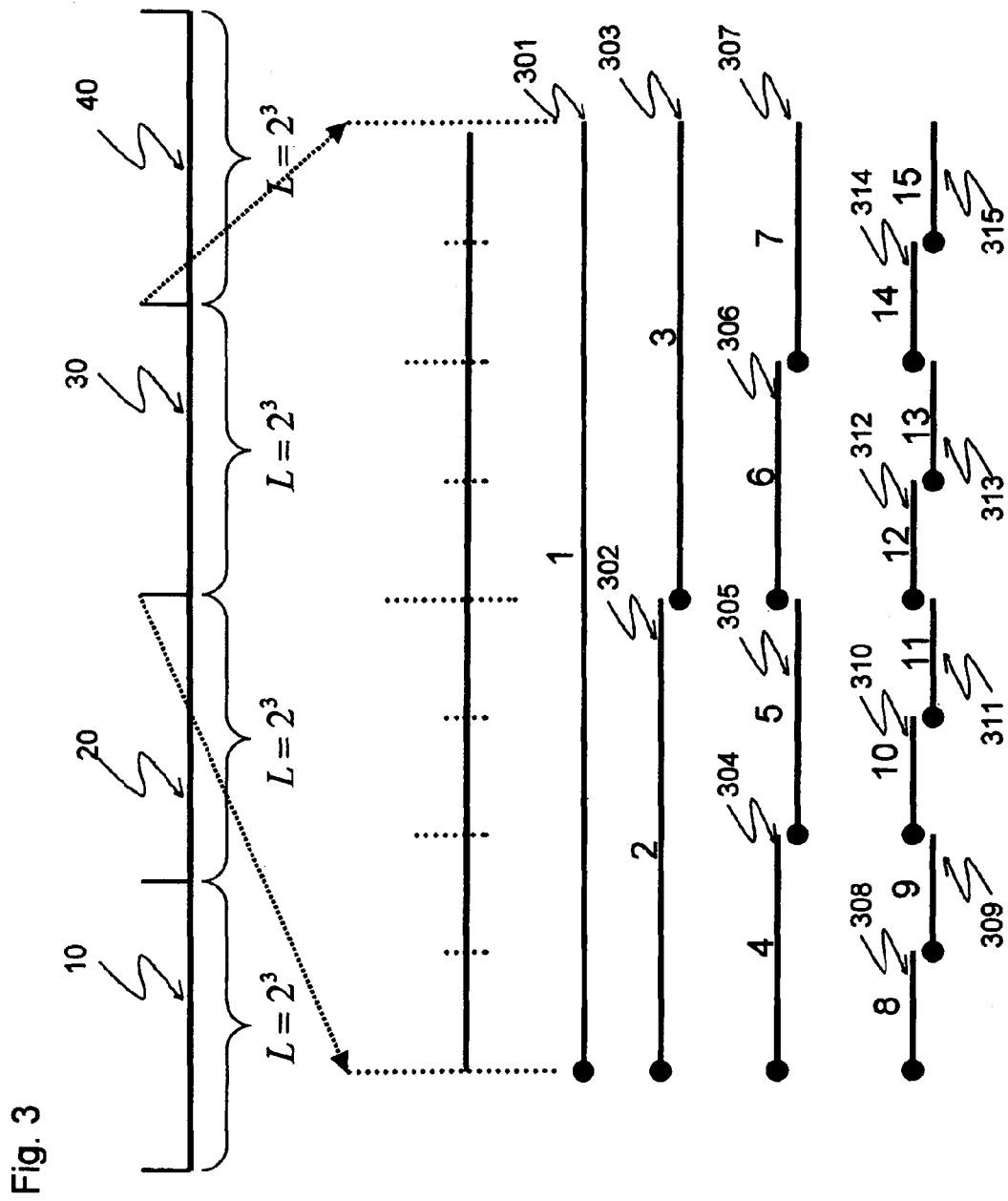
FIG. 3 conveys an example of encoded grid intervals.

FIG. 3 shows an example of encoded grid intervals. For the present discussion, it can be assumed that a time range from 0 to r is partitioned into multiple segments 10, 20, 30 and 40. Each segment is of length L and $L=2^k$, where k is an integer. In this example, k=3. Within each segment, there are (k+1) layers of overlapped grid intervals. For example, layer 0 grid intervals have length of L and layer k grid intervals have length of 1. Each grid interval in layer p contains exactly two grid intervals of half-length at layer p+1. For example, grid interval 301 contains grid interval 302 and 303 and its length is twice as long. CEIs within a segment are locally labeled following a perfect binary tree, so that the parent ID can be simply derived by dividing the ID of a child by 2. Each grid interval has a unique global ID. This global ID can be easily computed as 2iL+l, where i is the segment ID and l is the local ID.

The burst interval index includes an array of burst ID lists, each associated with a grid interval. A burst is first decomposed with one or more grid intervals and then its burst ID is then inserted into the burst ID lists associated with the decomposed grid intervals.

Figure 4:
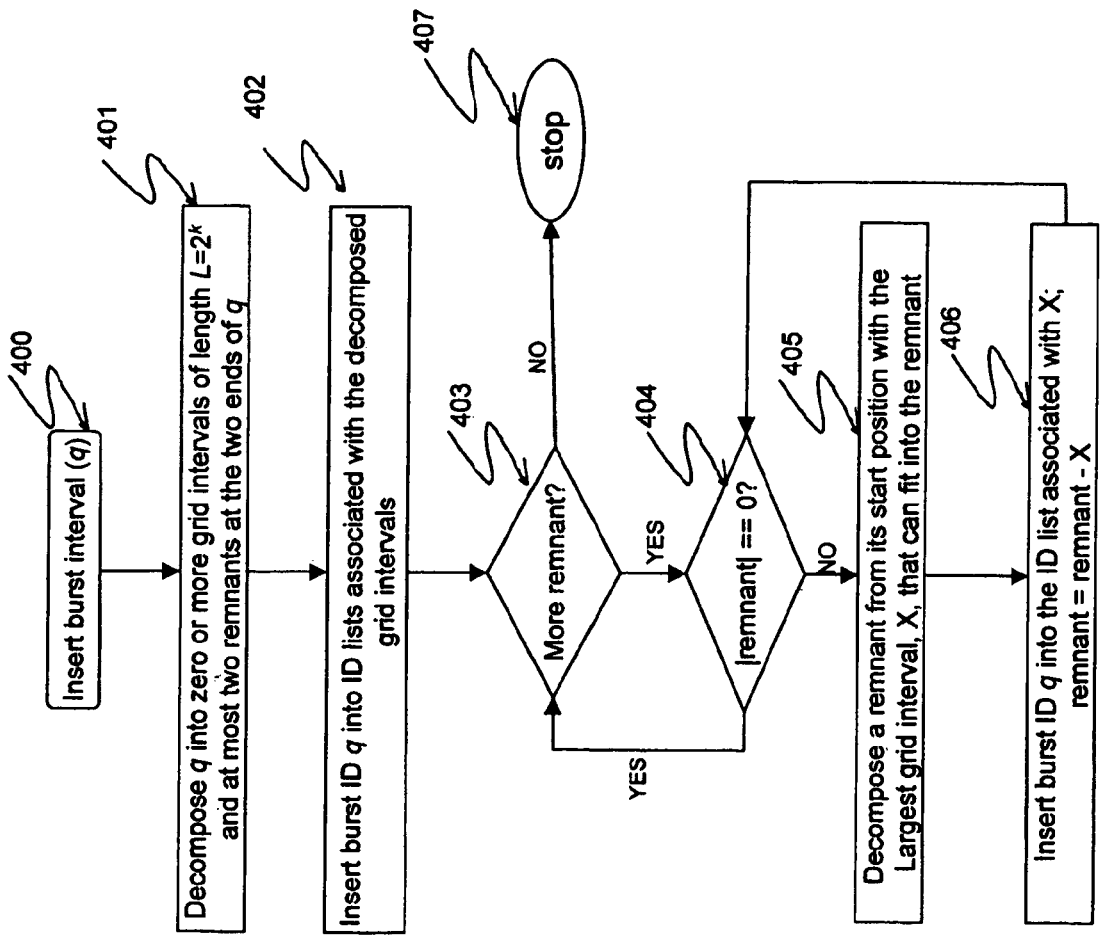
FIG. 4 schematically illustrates a process for inserting an interval.

FIG. 4 conveys a flow chart diagram for a process of inserting an interval. If the inserted burst interval q is longer than the segment length L, then it is first decomposed into multiple of grid intervals, or CEIs, of length L and at most two remnants at the two ends of q, 401. The burst ID q is then inserted into the burst ID list associated with the decomposed CEIs, 402. Then, the remnants are further decomposed with smaller sized grid intervals, 403. If the length of a remnant is zero, 404, then it proceeds to decompose the next remnant, 403. Otherwise, the process stops, 407. For remnant decomposition, it always tries to use the maximal-sized grid interval, if possible, 405. The burst ID is then inserted into the burst ID list associated with the decomposed grid interval, 406. After decomposition, the remnant is reduced by the decomposed grid interval, 406.

Figure 5:
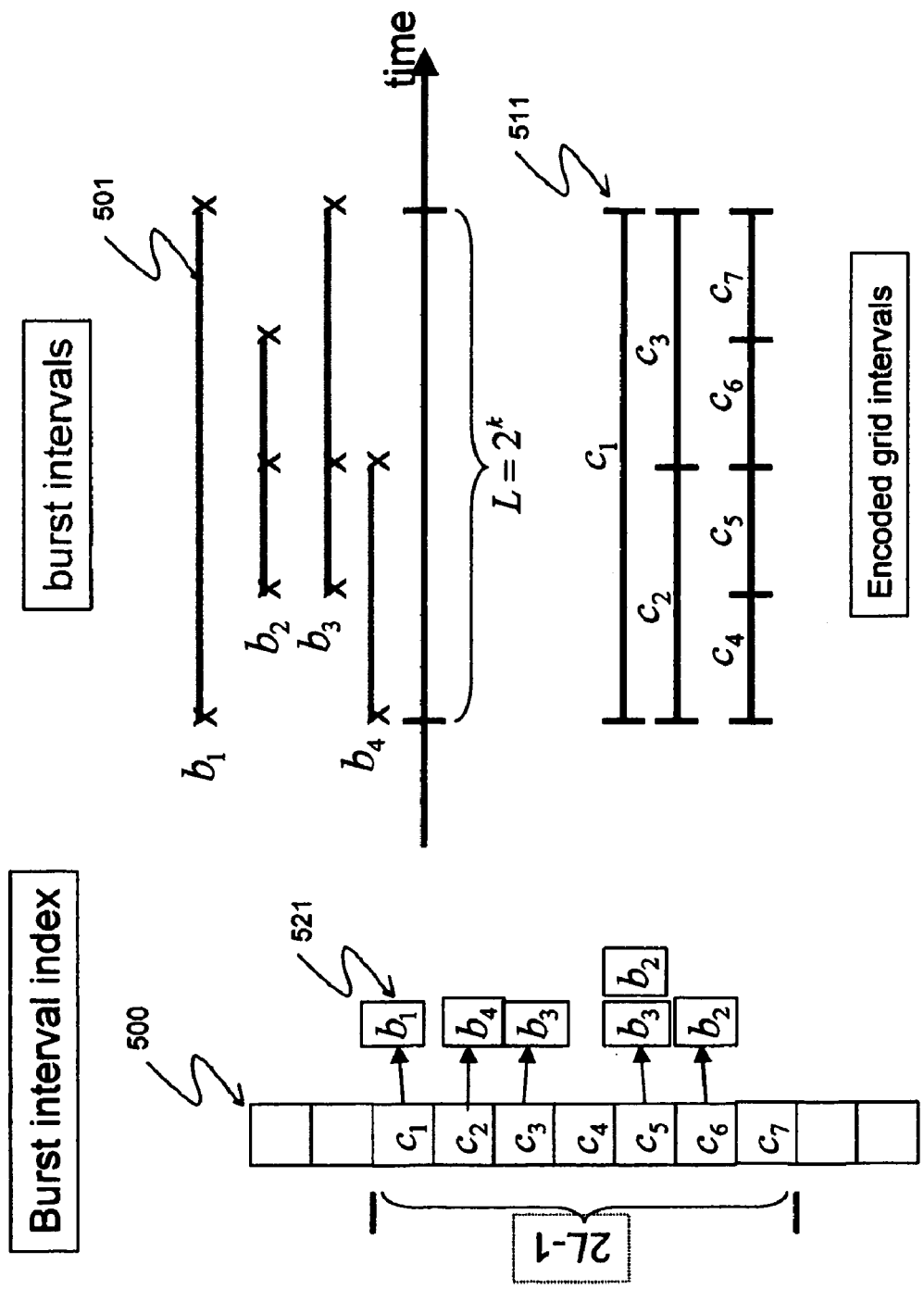
FIG. 5 depicts burst interval decomposition.

As an example, FIG. 5 shows a block diagram of burst interval decomposition. The burst interval index, 500, is an array of burst ID lists, one for each encoded grid interval. Burst interval $b_1$ 501 is decomposed into encoded grid interval $c_1$ 511. Hence, its burst ID is inserted into the burst ID list associated with $c_1$, 521.

Figure 6:
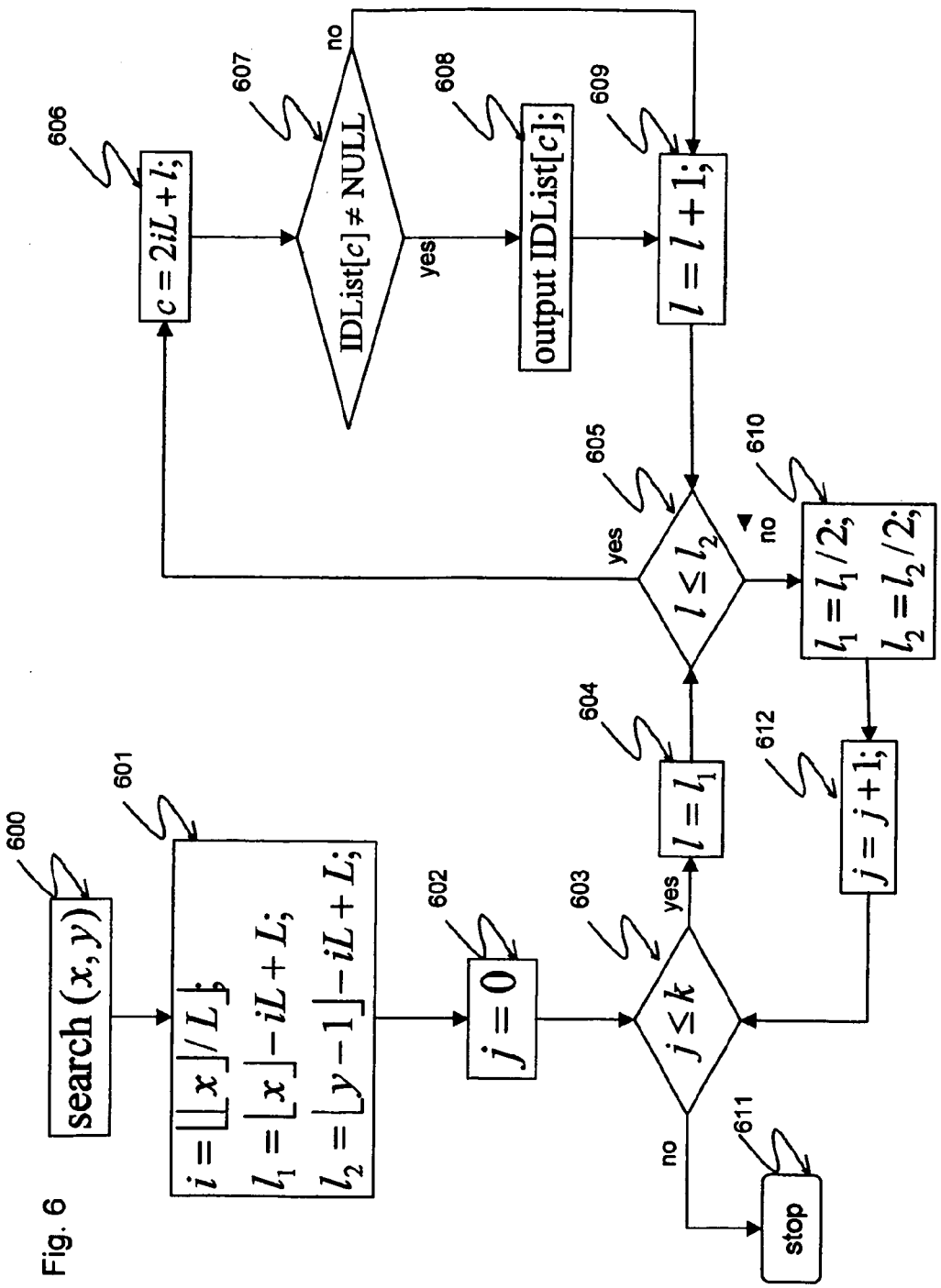
FIG. 6 schematically illustrates a process for searching a burst index.

FIG. 6 shows a flow chart diagram for a process of searching the burst index with a query time span (x, y), assuming that the query span is within a time segment of length L. Other cases can be similarly searched. First, it computes the segment ID and then it computes the local IDs of leftmost and rightmost unit-sized grid interval that is perfectly aligned with the two ends of the query span, 601. Then, there is a loop through each layer of grid intervals, starting from j=0, 602. For each layer, there is an examination of each grid interval consecutively from $l_1$, the leftmost, to $l_2$, the rightmost, 604-605. For each such grid interval, the grid interval ID is first computed, 606, and then the associated burst ID list is examined, 607. If this ID list is not empty, then the burst IDs stored with this list is outputted. From these burst IDs, the associated stream IDs can be found. After looping through each grid interval in the same layer, there is a move to a new layer that is the parent of the current grid intervals, 612. This can be easily accomplished by dividing the local ID by 2, 610, which is rather efficient because it can be done by a logical right shift by 1 bit. After all the k+1 layers of grid intervals are all searched, the process stops, 611.

It can readily be appreciated that the search algorithm described in FIG. 6 deals with a given query span. If a query is to find streams with correlated burst events within more than one query time spans, then FIG. 6 can be used to search the stream IDs for each individual time span. After all query time spans are searched, then we can combine the result by performing a logical AND operation. Namely, a stream ID must appear on the result of each query span.

Since time continues to advance nonstop, no matter what initial [0, r) is chosen for defining the encoded grid intervals, current time will exceed r at some point in the future. Selecting a larger r to cover a time-span deep into the future is not a good approach because the index storage cost will increase. This is because more burst IDs will be inserted into the index, requiring more storage. A better approach is to keep at most two indexes in memory, similar to the commonly-used double buffering concept. Specifically, we can start with [0, r). When time passes r, we create another index for [r,2r). When time passes 2r, we create another index for [2r,3r), but the index for [0, r) will be likely not needed any more and can be discarded or flushed into disk. Using this approach, no false dismissals are introduced, since any burst interval covering two regions can be divided along the region boundary and indexed or searched accordingly.

It can readily be appreciated that correlation of burst events can also be applicable to a number of other disciplines, such as identifying important news events in news streams from various sources, like CNN, MSNBC, ABC, and others. For example, the high frequency of "Hurricane Katrina" on the many news streams indicates the importance and the dominance of the event during the month of September 2005.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of correlating burst events among two or more data streams, said method comprising:
   executing one or more modules of code with a processor to perform steps comprising:
   identifying burst features in the two or more data streams;
   maintaining and updating a burst feature index via representing the burst features as burst intervals, each burst interval having a start point, an end point, a unique burst ID, and stream ID;
   searching the burst feature index; and
   identifying correlated data streams that exhibit burst interval overlap with one or more predetermined query time spans;
   wherein identifying correlated data streams comprises estimating a degree of correlation between burst features via calculating one or more time overlaps of burst features via employing an index feature; and
   wherein employing an index feature comprises employing a Containment-Encoded-Interval Index.

2. The method according to claim 1, wherein said maintaining and updating a burst feature index comprises maintaining an array of burst interval ID lists.

3. The method according to claim 2, wherein said maintaining an array of burst interval ID lists comprises:
   defining two or more layers of grid intervals;
   decomposing each burst interval with one or more grid intervals; and
   inserting a burst interval ID into burst interval ID lists associated with the one or more grid intervals.

4. The method according to claim 3, wherein said searching comprises:
   finding entire grid intervals that overlap with one or more predetermined query time spans; and
   finding entire burst interval IDs stored in burst interval ID lists associated with found overlapping grid intervals.

5. The method according to claim 4, wherein said finding entire grid intervals comprises:
   finding entire unit-sized grid intervals that are completely covered by the query span; and
   finding entire ancestor grid intervals for unit-sized grid intervals so found.

6. The method according to claim 5, wherein said finding entire grid intervals comprises, with a given query time span:
   for each layer of grid intervals, finding a leftmost and a rightmost grid interval overlapping with the query time span; and
   applying numerals between the leftmost and rightmost grid intervals via successively incrementing the grid interval ID by 1.

7. The method according to claim 1, wherein said maintaining and updating a burst feature index comprises maintaining and updating a burst feature index on-the-fly.

8. The method according to claim 1, wherein said identifying burst features comprises identifying burst intervals via imposing at least one threshold on data in the two or more data streams.

9. A computer system for correlating burst events among two or more data streams, said system comprising:
   a module for identifying burst features in the two or more data streams;
   a module for maintaining and updating a burst feature index via representing the burst features as burst intervals, each burst interval having a start point, an end point, a unique burst ID, and stream ID;
   a module for searching the burst feature index; and
   a module for identifying correlated data streams that exhibit burst interval overlap with one or more predetermined query time spans;
   wherein said module for identifying correlated data streams acts to estimate a degree of correlation between burst features via calculating one or more time overlaps of burst features via employing an index feature; and
   wherein said employing an index feature comprises employing a Containment-Encoded-Interval Index.

10. The system according to claim 9, wherein said module for searching acts to:
    find entire grid intervals that overlap with one or more predetermined query time spans; and
    find entire burst interval IDs stored in burst interval ID lists associated with found overlapping grid intervals.

11. The system according to claim 9, wherein said module for maintaining and updating a burst feature index acts to maintain and update a burst feature index on-the-fly.

12. The system according to claim 9, wherein said module for identifying burst features acts to identify burst intervals via imposing at least one threshold on data in the two or more data streams.

13. A program storage device readable by machine, tangibly embodying a program of instructions executable by the machine to perform:
    identifying burst features in the two or more data streams;
    maintaining and updating a burst feature index via representing the burst features as burst intervals, each burst interval having a start point, an end point, a unique burst ID, and stream ID;
    searching the burst feature index; and
    identifying correlated data streams that exhibit burst interval overlap with one or more predetermined query time spans;
    wherein identifying correlated data streams comprises estimating a degree of correlation between burst features via calculating one or more time overlaps of burst features via employing an index feature; and
    wherein employing an index feature comprises employing a Containment-Encoded-Interval Index.

14. The program storage device according to claim 13, wherein said maintaining and updating a burst feature index comprises maintaining an array of burst interval ID lists.

15. The program storage device according to claim 14, wherein said maintaining an array of burst interval ID lists comprises:
    defining two or more layers of grid intervals;
    decomposing each burst interval with one or more grid intervals; and
    inserting a burst interval ID into burst interval ID lists associated with the one or more grid intervals.

16. The program storage device according to claim 15, wherein said searching comprises:
    finding entire grid intervals that overlap with one or more predetermined query time spans; and
    finding entire burst interval IDs stored in burst interval ID lists associated with found overlapping grid intervals.

17. The program storage device according to claim 16, wherein said finding entire grid intervals comprises:
    finding entire unit-sized grid intervals that are completely covered by the query span; and
    finding entire ancestor grid intervals for unit-sized grid intervals so found.

18. The program storage device according to claim 17, wherein said finding entire grid intervals comprises, with a given query time span:
  for each layer of grid intervals, finding a leftmost and a rightmost grid interval overlapping with the query time span; and
  applying numerals between the leftmost and rightmost grid intervals via successively incrementing the grid interval ID by 1.

19. The program storage device according to claim 13, wherein said maintaining and updating a burst feature index comprises maintaining and updating a burst feature index on-the-fly.

20. The program storage device according to claim 13, wherein said identifying burst features comprises identifying burst intervals via imposing at least one threshold on data in the two or more data streams.

* * * * *